United States Patent [19]

Smith

[11] Patent Number: 4,962,331
[45] Date of Patent: Oct. 9, 1990

[54] ROTATABLE CONTROL SIGNAL GENERATOR

[75] Inventor: Charles S. Smith, Pompton Plains, N.J.

[73] Assignee: Servo-Tek Products Company, Inc., Hawthorne, N.J.

[21] Appl. No.: 379,634

[22] Filed: Jul. 13, 1989

[51] Int. Cl.$^5$ .................... H02K 19/24; H01F 21/06; H02P 9/02
[52] U.S. Cl. .................................. 310/261; 310/208; 318/661; 324/207.11
[58] Field of Search ............... 310/111, 155, 162, 168, 310/261, 208, 216, 67 R; 318/661; 324/208, 207.11

[56] References Cited

U.S. PATENT DOCUMENTS

| | | | |
|---|---|---|---|
| 4,358,723 | 11/1982 | Scholl et al. | 318/661 |
| 4,659,953 | 4/1987 | Luneau | 310/168 |
| 4,682,065 | 7/1987 | English et al. | 310/67 R |
| 4,755,751 | 7/1988 | Ray | 318/661 |
| 4,771,200 | 9/1988 | Ritzinger | 318/661 |

Primary Examiner—Mark O. Budd
Assistant Examiner—D. L. Rebsch
Attorney, Agent, or Firm—Body, Vickers & Daniels

[57] ABSTRACT

A rotary control signal generating device, such as a resolver, which comprises an internal stator including a magnetic system having first and second ring-shaped pole pieces with generally cylindrical, axially spaced, outwardly facing first and second pole surfaces. These pole surfaces are generally concentric with respect to a central axis and have the same outer diameter. The two pole pieces each include a given number of equally spaced coil receiving slots with axially spaced pole pieces aligned to form sets of circumferentially spaced slots. The stator includes a multiturn or primary exciter winding between the two pole pieces and wound concentric with the axis, whereby an AC voltage magnetizes the pole pieces. The stator further includes two offset sensing windings on the same pole pieces and in the axially aligned sets of slots. The resolver includes an external rotor with a high permeability flux concentrating ring having an inwardly facing, cylindrical surface concentric with the axis and spaced slightly outward in a radial direction from the first and second pole surfaces. The inwardly facing surface of the flux concentrating ring is axially skewed a distance correlated with the given axial spacing between the two pole surfaces whereby, while a first portion of the ring is across from the first pole surface, a circumferentially spaced second portion of the ring is across from the second pole surface. Further, the two spaced sensing windings have a unique winding configuration such that leads thereof correct the error curve of individual resolvers.

53 Claims, 10 Drawing Sheets

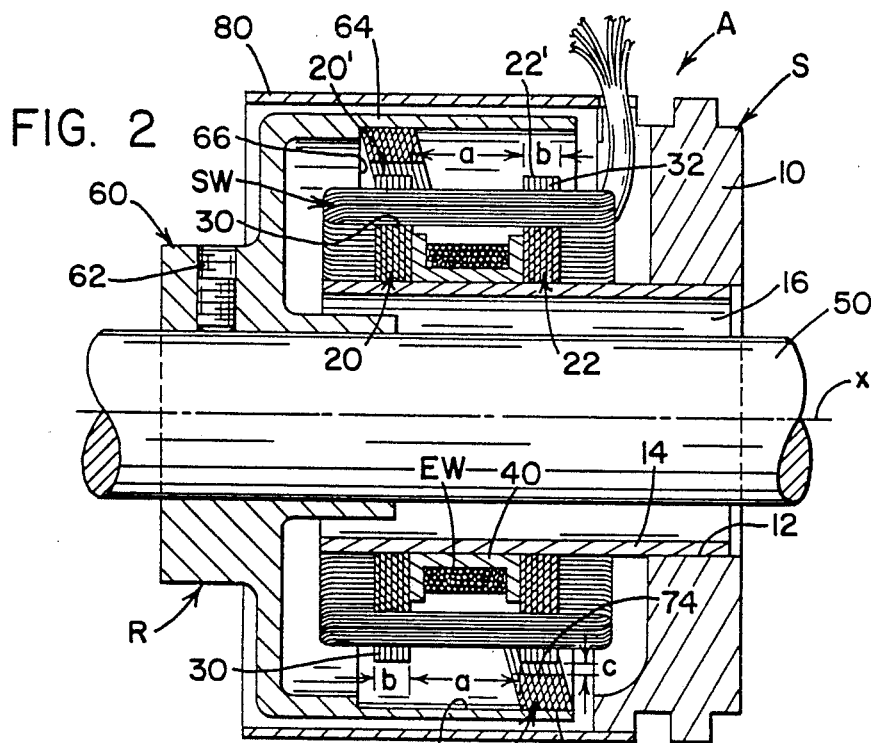
FIG. 2
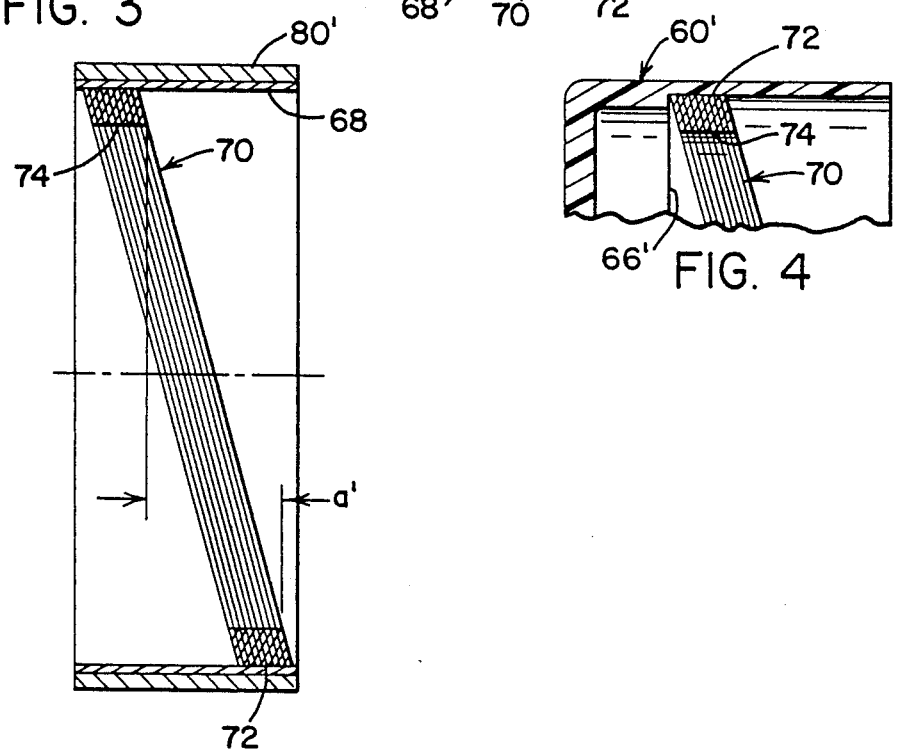
FIG. 3
FIG. 4

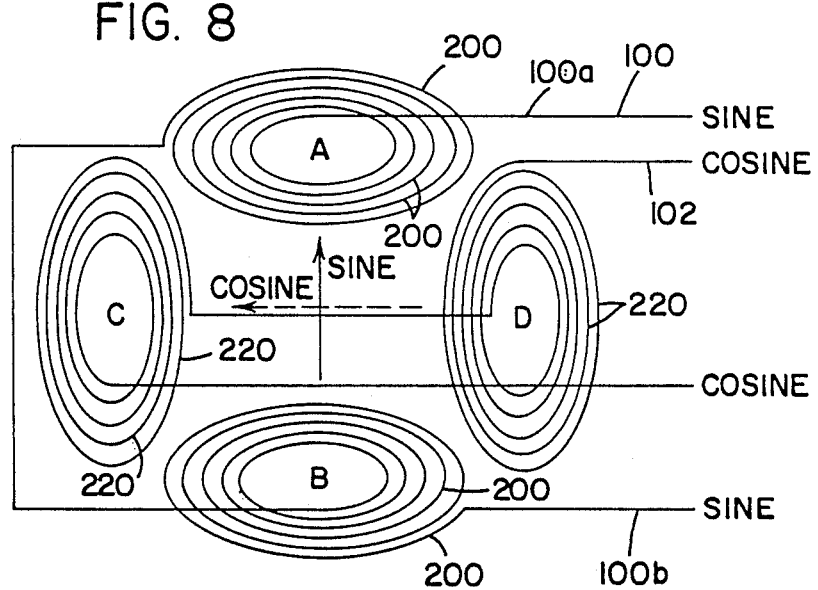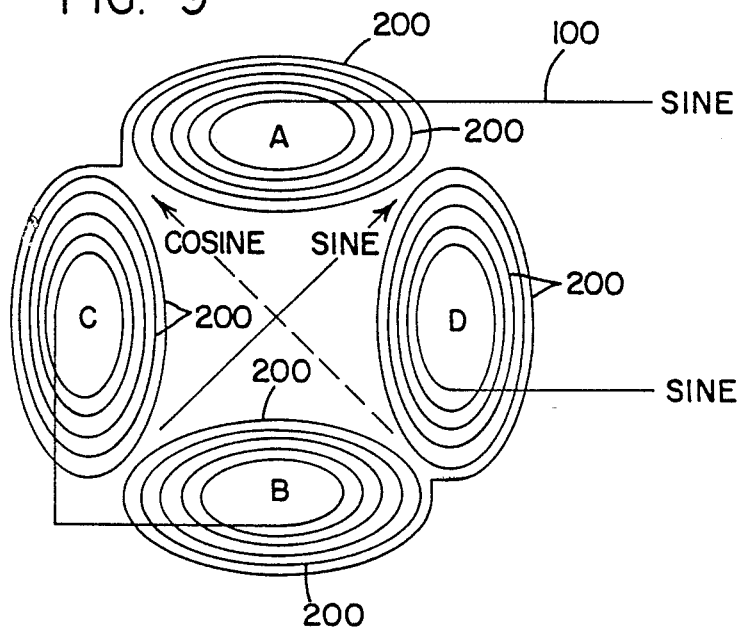

FIG. 10
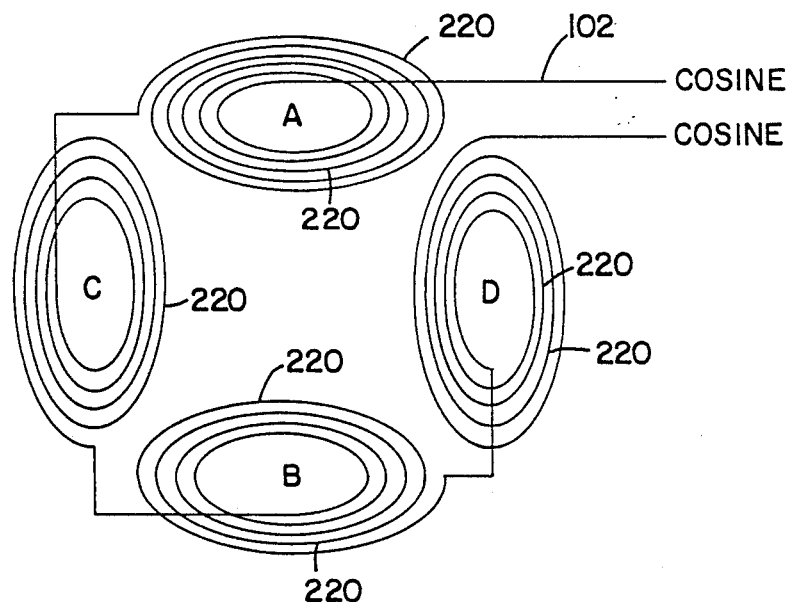
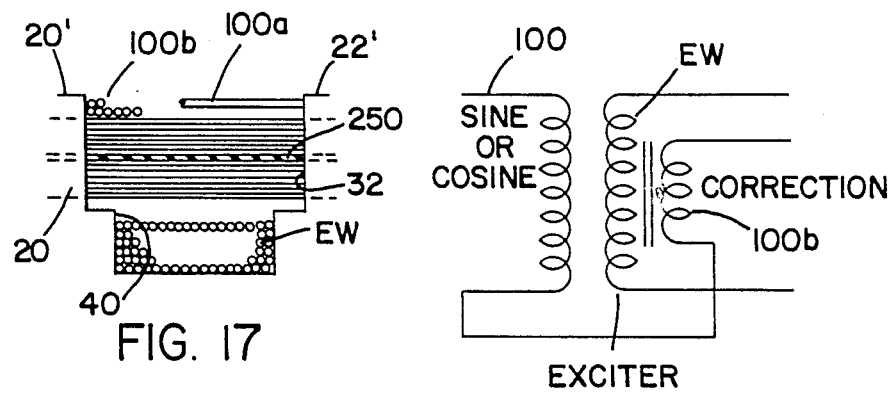
FIG. 17
FIG. 18

ROTATABLE CONTROL SIGNAL GENERATOR

The present invention relates to the art of rotary controlled generating devices and more particularly to a resolver.

INCORPORATION BY REFERENCE

Luneau U.S. Pat. No. 4,659,953 and Luneau Re U.S. Pat. No. 32,857 disclose a unique magnetic structure for a rotary signal generating device, which structure can be employed as a tachometer, synchro or resolver, and also certain signal processing circuitry for these uses. These two patents illustrate background information for the present invention and are incorporated by reference herein so that details of the magnetic structure of the present invention need not be repeated. A similar rotary device used as the resolver is disclosed in Nagarkatti U.S. Pat. No. 4,631,510 showing what is referred to as a harmonically graded air gap reluctance rotary electric resolver. The air gap to a magnetic rotor is made to vary sinusodially to create a fundamental wave shape in orthogonally positioned sensing windings of an outer stator. This patent is also incorporated by reference as background information illustrating the operation of a resolver with a rotary flux concentrator and a standard pole piece structure. A further similar device using a rotary flux concentrator with standard fixed orthogonal sensing coils is illustrated in Ringland U.S. Pat. No. 3,641,467. This patent is also incorporated by reference as background information.

BACKGROUND OF INVENTION

The present invention is especially applicable to the construction of a resolver; however, the invention, or at least certain aspects thereof, have application to other rotary signal generating devices. Consequently, the disclosure of the invention is not intended to be specifically limited only to a resolver.

In controlling various rotary devices with substantial positional precision, it is important to be able to determine the exact angular position of a rotary element, such as a shaft, at any given instant. This requirement becomes immensely more important as accuracy and automation demands increase. For this reason, substantial effort has been devoted for many years to a rotary device which will accurately determine and record the exact position of a rotary element within small tolerances. These efforts, and the demands to which they are directed, have resulted in extremely expensive signal generating devices for detecting and signaling the position of a rotary shaft. Such devices must be repeatable, and accurate. Errors of only ten to twenty minutes are unacceptable in certain applications. Such practical demands are somewhat inconsistent with the requirement that the device be fixed to a rotary element which may be eccentric and include a stationary element. Consequently, even mechanical misalignment and vibration and inertia can result in errors between the actual angle of an element being monitored and the reading of the resolver. This relationship of the constructed or measured angle as a function of the actual angle is referred to herein as the "error curve" of the resolver. The ability to reduce error or create an acceptable "error curve" and assure accuracy and repeatability from one resolver to the next while maintaining a competitive cost is an important commercial objective of any resolver design or improvement. Reduction of only a few minutes in the error curve of a resolver drastically enhances the overall acceptability of the resolver. Such reduction in error to specified limits is an objective which must be obtained while avoiding substantial increases in manufacturing cost of a resolver. To accomplish the level of error required in the field, relative accurate resolvers and synchros have been developed. However, they are expensive.

A resolver is a rotary transformer having a primary winding across which a fixed frequency ac exciting voltage is applied. Two secondary windings are orthogonally positioned to create a trigonometric sine and cosine induced voltage level reflective of the angle between the rotary element ("rotor") of the resolver and the stationary element ("stator") of the resolver. Rotation of the primary winding with respect to the orthogonal secondary windings, known as the sensing windings, creates voltages in the two output or sensing windings so that the relative magnitude of these two voltages can be detected and translated into an angular position between the rotor and stator. As an example, the voltage on one output winding, assuming a transformer ratio of 0.5 and a voltage of 4 volts on the exciting winding, is twice the cosine of the displacement angle. In this same example, voltage across the other winding is twice the sine of the same angle. In a two pole resolver, the sine and cosine voltage curves complete a cycle in 360°. Of course, a four pole resolver would have sine and cosine voltage curves which create a total cycle in 180°. This resolver would have two voltage cycles per revolution of the rotor with respect to the stator. The primary advantage of the resolver is the infinite resolution of the output voltages for any angular position of the rotor with respect to the stator. This angle sensing concept has been employed for a number of years and efforts have been exerted recently to increase the accuracy by reducing the error without a drastic increase in cost.

The present invention is particularly applicable to a resolver; however, certain aspects of the invention could be used in a synchro which is essentially as a resolver, except the sensing coil is a three phase winding spaced around the stator at 120° increments. The resolver employs two groups of windings spaced from each other 90° to produce the sine cosine output voltages previously described. The synchro uses three groups of windings.

For many years, both a resolver and synchro were excited by using slip rings for directing the fixed frequency ac voltage to the exciter winding on the rotor of the device. Use of slip rings created substantial mechanical difficulties and poor reliability. To overcome this disadvantage, some resolvers used a second transformer action wherein the A.C. exciter voltage for the rotor of the device was induced into a secondary winding on the rotor. A primary winding encircling this secondary winding carried an ac fixed frequency voltage that was induced into the secondary winding on the rotor. In this manner, the exciting voltage is applied to the rotor where it is employed for the purpose of exciting the orthogonal or three phase sensing windings carried on the surrounding stator.

The remainder of this discussion will relate to resolvers only; however, the discussion is equally applicable in many respects to synchros. In the past, resolvers often included internal and external stacks of laminations forming two facing pole pieces. One pole piece was on the stator and the other was on the rotor. The exciter winding was wound onto the internal rotor stack or pole piece and the orthogonal sensing windings were wound on the external stator stack or pole piece. Thus, the resolver was quite expensive and required complex manufacturing procedures and winding techniques for both the stator and rotor. The windings in such resolvers had variable pitches with a different number of turns in the various individual coils, which coils were spaced around the stator. The number of turns of the coils were chosen by a Fourier analysis based upon the variable pitch needed in winding the coils to eliminate higher harmonics in the output voltages and reduce the error curve. The "error curve" is, by definition, the difference between the actual rotor angle and the angle developed by the ratio of the sine and cosine output voltages. This "error curve" can be created by detecting the rotor angle with a precision encoder and comparing this actual angle with the created or imaginary angle from the sine/cosine processor. The sine/cosine processing and the Fourier analysis is performed by use of an appropriate computer. The measured error is processed by a Fourier processor to produce an output "error" for each of the harmonics, as well as for the fundamental. Only the low order harmonics are present since the windings essentially cancel all harmonics above the fourth harmonic.

Resolvers including a rotary exciting winding and a two phase output sensing winding network were used for many years. A substantial improvement of this concept was developed wherein a variable reluctance was employed for a resolver. The orthogonal sensing coils were wound around circumferentially spaced slots in an external stator. An internal rotor formed from a high permeability magnetic material and having two or more air gaps of different reluctances spaced circumferentially around the rotor was rotated within the stator to create variable reluctances from the many poles spaced around the stator. This structure produced an extremely accurate multi-pole brushless, transformless resolver. The exciting coils were also wound with respect to the pole pieces on the stator. Consequently, the fixed frequency A.C. exciting voltage and the two orthogonally displaced sensing voltages were wound onto the outer stator. A version of this concept is illustrated in Ringland U.S. Pat. No. 3,641,467 and Nagarkatti U.S. Pat. No. 4,631,510. By connecting the orthogonally positioned output coils in opposition, the fundamental, i.e. first harmonic, was essentially eliminated. Thus, the harmonic of concern was created by the combination of slots determining the spacing of pole pieces around the internal portion of the stator. These resolvers did not gain wide acceptance although they were inexpensive to manufacture and exhibited substantial potential. It was found that such variable flux resolvers have large electrical phase shifts between the excitation voltage and the output voltages. There were extremely low harmonic output voltages for detecting the angular position. Consequently, such brushless, transformless resolvers functioning by variable reluctance are available, but are used only in limited applications. In recent years, as illustrated in the two above mentioned patents, improvements have been made to produce better output signals; however, they have still not been widely adopted since these devices had to be manufactured with precision, employing accurate bearings to control eccentricity and squareness. Further, such resolvers were difficult to mount on a pendulous shaft. Further, the excitation and output windings were connected in opposition. This reduced the effectiveness of the windings.

All of these disadvantages have been overcome by the new type of transformless brushless resolver disclosed in Luneau U.S. Pat. No. 4,659,953 and Luneau Re U.S. Pat. No. 32,857. In this new type of resolver or synchro, the stator did not include a single stack. There are two separate and distinct axially spaced stacks on the stator. These stacks produce inwardly facing pole pieces that are magnetically connected to produce a return magnetic path facing axially outward of the pole pieces. The exciting coil is wound concentric with the surface of the pole surfaces and between these surfaces. The rotor is a high permeability magnetic member that creates a low reluctance magnetic path that extends from one stack on the stator to the other spaced stack on the stator. The exciting coil produces a flux that emanates radially inward from one stack to the other. The rotor concentrates the flux appearing at one position on the first stack and connects this one position in a low reluctance path to a radially different position on the second stack of the stator. Thus, the rotor completes the magnetic path between the two axially spaced stacks or pole surfaces. As the rotor rotates with the shaft being monitored, the flux path created by the exciting winding rotates. In this manner, misalignment of the rotor causes no meaningful error in the detected voltages induced into the two orthogonal sensing windings mounted on the stator. As the rotor is turned, flux is rotated and changes the coupling to the sine and cosine windings in the stator, as in a conventional resolver configuration. Even though this new variable flux, transformless, brushless resolver has been a substantial improvement in the technology and is widely used for precision measurement of the position of a rotary element, such as a shaft, the unit is somewhat expensive to manufacture. In addition, substantial effort is required during the manufacturing to assure a satisfactory error curve. As tolerances for many applications are being reduced, even more pressure is applied to develop a resolver having the extremely advantageous concepts of the Luneau unit, but with reduced cost and reduced variations in the error curve even when the device is mass produced with a minimum of manual operations.

THE INVENTION

The present invention is directed toward an improved resolver employing the concepts disclosed in Luneau U.S. Pat. No. 4,659,953 and Luneau Re U.S. Pat. No. 32,857 while reducing the manufacturing cost and increasing the repeatability of outputs, with error curves having small deviations.

In accordance with the present invention, there is provided a rotary control signal generating device, such as a resolver, comprising an internal stator including first and second ring-shaped pole pieces having a generally cylindrical, outwardly facing first and second pole surfaces. These concentric pole surfaces are axially spaced a given distance and are generally concentric with a given or central axis. Each of these pole surfaces has essentially the same diameter so that they create a generally cylindrical member, with a defined spacing between the pole surfaces. The two axially spaced pole pieces include a given number of coil receiving slots equally spaced circumferentially around the spaced pole pieces and with the slots on the first pole piece being axially aligned with corresponding slots on the second pole piece to form circumferentially spaced sets of coil receiving slots. The stator further includes a multiturn A.C. primary exciter winding wound between the two pole pieces and wound in a direction concentric with the axis of the pole pieces whereby an ac voltage, of known frequency, magnetizes the axially spaced pole pieces. Of course, a return magnetic path is provided internally of the exciter winding. First and second positionally offset sensing windings are wound on the same pole pieces and in the aligned sets of slots These output windings are orthogonally positioned on the pole pieces and include a substantial number of series connected, individual coils wrapped between spaced slots. The coils have a number of turns to produce a generally sinusoidal output wave form; consequently, the coils do not all include the same number of turns. Of course, two or more coils can have the same number of turns according to the dictates of the output windings as will be explained.

The invention further includes an external, rotor mounted to rotate about the central or given axis of the stator. This rotor includes a cup-shaped housing carrying a high permeability flux concentrating ring with an inwardly facing, generally cylindrical surface concentric with the aforementioned central axis and spaced slightly outwardly in a radial direction from the first and second pole surfaces. The cylindrical inwardly facing surface of the flux concentrating ring is axially skewed a distance corresponding to or correlated with the given distance or spacing between the axially spaced pole pieces so that as a first portion of the ring is across from the first pole surface, a circumferentially spaced second portion of the ring is across from the second pole surface. As the flux concentrator rotates about the outer surface of the stator, the flux field or path determined by the position of the flux concentrating ring rotates about the stator as the flux field is created by the fixed frequency ac voltage applied to the exciter winding. In practice, the width of the surface on the flux concentrating ring is substantially greater than the width of the pole surfaces on the axially spaced pole pieces. In addition, the skewing is a gradual curve with the two axially spaced or offset positions of the skewed ring being diametrically opposite to each other.

By producing a resolver in accordance with the present invention, the sensing or output windings can be produced on a conventional armature winding machine. In the prior units disclosed in the Luneau patents the output windings had to be laid into the inside wall of the stator. This change substantially reduces the cost of producing the resolver and increases the consistency of manufacturing. Further, such procedure allows adjustment of the turns in the various windings forming the sine and cosine sensing winding to eliminate harmonics and reduce the error associated with the lower harmonics. The rotor now rotates on the outside of the stator. The magnetic circuit is essentially the same as the structure disclosed in the Luneau patents; however, the resolver can be manufactured substantially at a reduced cost and has better output characteristics. Resolvers substantially smaller than 0.5 inches in diameter can be manufactured using the present invention since only one wound element is required.

In accordance with another aspect of the invention, the two orthogonally positioned output windings can have a constant pitch so that the size of each of the several series connected coils forming an output winding extend between the same number of slots in the two axially spaced pole pieces. The constant pitch coils forming an output winding can have different numbers of turns to produce the desired sinusoidal output wave form. The fixed frequency ac exciter winding is easily wound on a spool placed between the axially spaced stacks forming the spaced pole pieces.

A resolver constructed in accordance with the invention can be provided with an internal shaft extending through the stator and connected to the rotor on the opposite side of the resolver from its mounted side. The rotor itself is secured onto the rotatable shaft being monitored. The rotor and stator do not have to be matched sets because miniscule errors are associated with the slight manufacturing differences between rotor and stator or any deviation in the alignment of the rotor or stator in a particular application. This aspect of the present invention minimizes the effect of any eccentricity on the performance of the resolver. By providing relatively large air gaps, the variations in eccentricity are minimized in the output signals. By recognizing this advantage of the present invention, the outer surface of the stator and the inner surface of the ring on the rotor need not be precision ground, which manufacturing procedure is a requirement in reducing the error curve in most resolvers.

The first embodiment of the present invention will be described as a resolver with a two pole configuration, wherein the sensing winding for the sine includes two groups of individual coils connected in series, with the first group diametrically opposed to the second group. The cosine winding includes the same configuration with the two groups of individual coils located at orthogonal positions with respect to the sine winding. The shape of the flux concentrating ring that is rotated by the rotor includes two axially spaced portions The portions are offset 180° to produce a single flux cycle during each revolution of the ring. Of course, this flux concentrating ring could be undulating with four or more spaced portions to create a higher number of cycles per revolution of the rotor; however, best results are obtained by a single output cycle for each revolution. This is the illustrated embodiment of the present invention.

In accordance with the preferred embodiment, the sine and cosine voltages are applied to the standard R-D chip to produce positional information in digital form. In this manner, the Hall Effect output circuits discussed in prior patents are not used in implementation and application of the present invention.

In accordance with another aspect of the present invention, the sine and cosine windings forming the sensing windings of the resolver are configured in a unique winding pattern or technique. Each output winding includes several individual coils in a first group and several individual coils in a second group, with all these coils being connected in electrical series. The two groups of coils are mounted at diametrically opposite positions on the stator. The two groups of coils forming the sine winding are offset 90° from the two groups of coils forming the cosine winding. Thus, the groups of coils are essentially positioned in an orthogonal pattern on the stator. As so far described this winding technique is somewhat standard practice In accordance with the first aspect of the invention, in the area of winding of the resolver each coil in each group of both output windings has the same pitch. In the preferred embodiment the constant pitch is a spacing having seven slots on the stator pole pieces between the slots actually receiving the two sides of the individual coil. Each coil has a preselected number of turns determined in accordance with standard procedures to produce an acceptable sinusoidal output wave form. In the past, resolvers had coils which employed variable pitches, even though the number of turns for the individual coils was varied as done in practicing the present invention. In accordance with the broadest aspect of the present invention, with respect to the novel winding features, the individual coils each have a constant pitch and a variable number of turns. To further reduce mechanical and electrical variations, in accordance with another aspect of the invention, each of the output windings is divided into four separate groups of individual coils. These individual groups are positioned at four equally spaced locations around the stator. Thus, the groups are located at positions spaced each 90° around the stator. These two output windings, including four groups of coils, are offset orthogonally around the stator. Thus, the output curves for the sine and cosine remain at a 90° phase angle. This winding configuration of this aspect of the invention still includes coils having a fixed pitch and variable number of turns. By providing this winding arrangement with each output winding having four spaced groups of coils, symmetry and accuracy of the resolver is substantially enhanced.

The present invention produces a resolver having a relatively small deviation in error curve. Fluctuations of less than 20 minutes from the actual angle are generally experienced. In accordance with another aspect of the present invention, fundamental (first harmonic) error in the error curve is corrected with a lead of the sensing windings which can be wrapped around the exciter winding to shift the output voltage. This auxiliary winding is wrapped in the proper direction to cancel out any offset of the voltage curve. In accordance with another aspect of the invention, if the second harmonic error of a resolver made in accordance with the present invention deviates beyond a preselected amount, which is normally not experienced, the input lead of one of the sensing windings can be wrapped around the stator between preselected slots. This procedure cancels out the aberration in the detected error curve of the resolver. This correctable error can be determined by a Fourier analysis of the error curve indicating the position of greatest error for the second harmonic. Each turn of the sensing winding lead adds or subtracts a certain preknown number of minutes at a given location on the resolver. The "error curve" has been previously described as the single cycle error indicating deviations between actual angles and detected angles by the orthogonal sensing windings. A Fourier analysis of this curve indicates the type of error and where the lead of the sensing windings is to be positioned.

The primary object of the present invention is the provision of a brushless resolver, which resolver does not require a rotary transformer to supply the exciting field and wherein the windings are located in the stationary member of the resolver. A flux field is rotated by a magnetic flux concentrating element carried by the rotor of the resolver.

Another object of the present invention is the provision of a brushless resolver as defined above, which resolver is inexpensive to manufacture, consistent in output performance and exhibits low deviations on the error curve.

A further object of the present invention is the provision of a resolver, as defined above, which resolver is generally immune to eccentricities and manufacturing variations, as well as to the manner in which it is mounted and operated.

Still another object of the present invention is the provision of a resolver, as defined above, which resolver can be made relatively small, at a low cost and will be substantially more reliable than existing resolvers.

Another object of the present invention is the provision of a resolver, as defined above, which resolver reduces the need for precision manufacturing of the rotor and stator and reduces the inventory of parts because the stator and rotor do not need to be matched. Use of the invention also reduces the testing procedures and corrective measures taken during manufacturing of the resolver.

Yet another object of the present invention is the provision of a resolver, as defined above, which resolver has an accuracy and precision which allows this relatively low cost resolver to be used in applications now reserved for high cost resolvers of the type having a transformer input to a rotating exciter winding.

Still a further object of the present invention is the provision of a resolver, as defined above, which resolver has a rotor with relatively low weight.

Another object of the present invention is the provision of a resolver, as defined above, which resolver has an increased life and improved reliability due to the elimination of rotating windings.

Still a further object of the present invention is the provision of a resolver, as defined above, which resolver can operate at higher speeds, which is also made possible due to the low weight of the cup-shaped rotor encircling the cylindrical stator carrying the windings.

Another object of the present invention is the provision of a resolver, as defined above, which resolver includes no coupling member or bearings between the motor shaft and the resolver wherein the rotor mounts directly on the motor shaft. This feature further reduces cost and improves reliability and performance of the resolver.

Yet another object of the present invention is the provision of a method of winding the stator of a resolver, which method decreases costs and improves accuracy of the resolver.

The above identified objects and advantages will become apparent from the following description taken together with the accompanying drawings which are described in detail below.

BRIEF DESCRIPTION OF DRAWINGS

FIG. 2 is a cross sectioned side elevational view of the preferred embodiment of the present invention including an optional outer flux shield;

FIG. 3 is a cross-sectional, partial side view of the stator illustrating an alternative construction of a rotor for use in the present invention;

FIG. 4 is a partial, enlarged cross-sectional side view showing a further modification of the rotor used in practicing the present invention;

FIG. 8 is a schematic winding layout illustrating one feature of the present invention;

FIG. 9 is a schematic winding layout showing a further aspect of the present invention used to create the sine sensing winding;

FIG. 10 is a schematic winding layout similar to FIG. 9 for the cosine sensing winding;

FIG. 17 is a partial cross-sectional view through the spool for the exciter winding and between aligned coil receiving slots of the preferred embodiment of the present invention; and, FIG. 18 is a schematic wiring diagram illustrating a procedure employed in accordance with one aspect of the invention for shifting the output voltage of the preferred embodiment of the present invention to correct the fundamental or first harmonic error.

PREFERRED EMBODIMENT OF THE INVENTION

Figure 1:
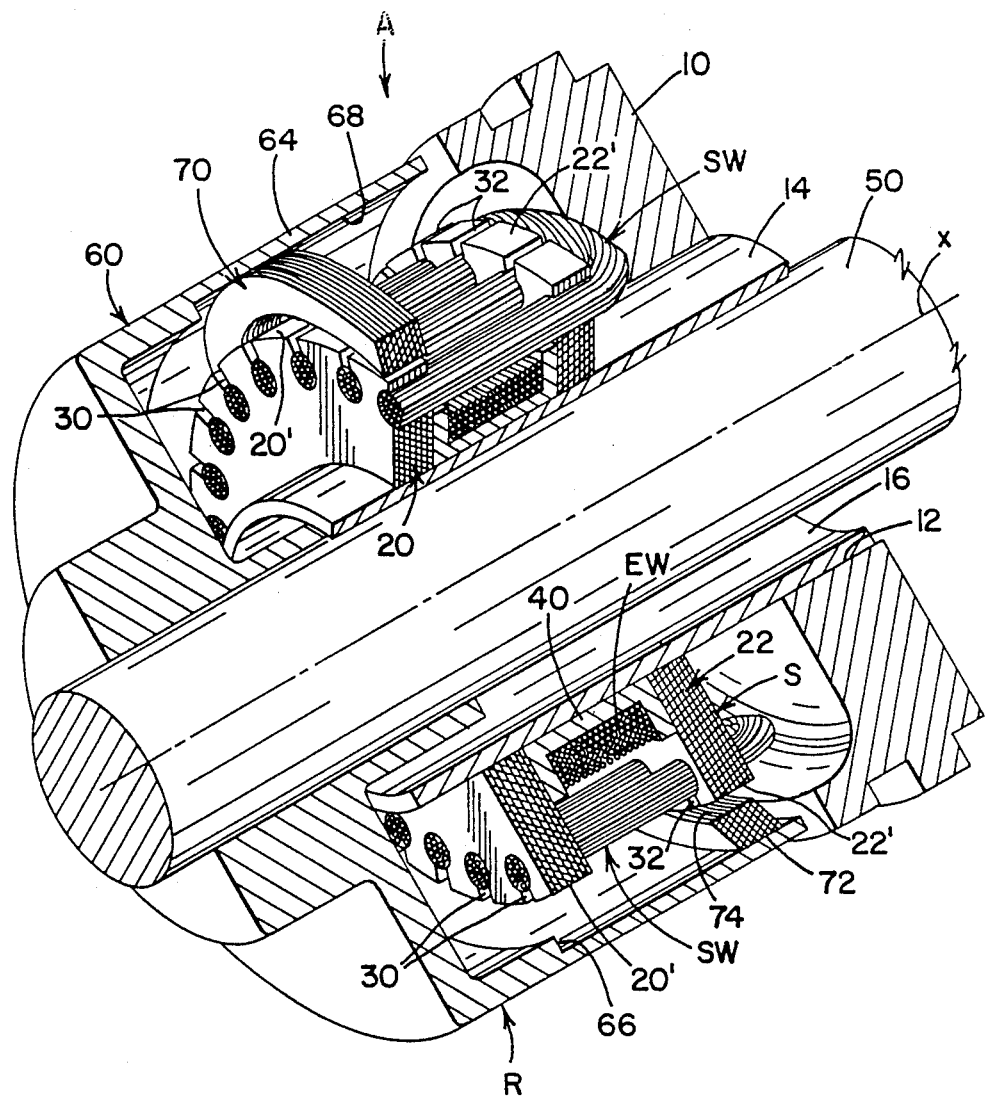
FIG. 1 is a pictorial, partially cut away side view of the preferred embodiment of the present invention.

For the purposes of illustrating a preferred embodiment of the invention and not for the purpose of limiting same, FIGS. 1 and 2 illustrate a resolver A constructed in accordance with the present invention and having a stator S and a rotor R. The stator includes a fixed mounting plate, or ring, 10 having a central opening 12 generally concentric with a central axis x. Within opening 12 is fixedly mounted an outwardly extending sleeve 14 having a central shaft receiving opening 16. Sleeve 14 is mounted in cantilever fashion from the face of plate 10 and supports first and second laminated pole pieces 20, 22 constructed in accordance with standard practice from a stack of soft iron laminations. The pole pieces are ring shaped and have inner surfaces fixedly mounted to sleeve 14 in a manner to space the pole pieces from each other a distance a, shown in FIG. 2. Sleeve 14 is used to complete the low reluctance path between pole pieces 20, 22. The axially spaced outer pole pieces 20', 22' of pole pieces 20, 22, respectively, are cylindrical outer surfaces and have a width b. Circumferentially spaced around pole pieces 20, 22 are a selected number of equally spaced coil receiving slots 30 on pole piece 20 and slots 32 on pole piece 22. These slots are axially aligned in the axially spaced pole pieces so that they form circumferentially spaced sets of slots into which several individual wrapped coils of the two sensing windings SW are located. The individual coils, to be explained in more detail later, are wound in the sets of slots 30, 32 as best shown in FIG. 2. The sets of slots divide the surfaces 20', 22' into a series of teeth. As will be explained later the teeth circumscribed by the individual coils form one of the poles for that coil. Each coil is not wrapped about only a single tooth as shown in Ringland U.S. Pat. No. 3,641,467 and Nagarkatti U.S. Pat. No. 4,631,510. The number of teeth between the opposite sides of a coil wrapped into the slots will magnetically affect the voltage induced into that particular coil as resolver A operates. The spaced pole pieces 20, 22 are magnetically joined by a high permeability sleeve 14. Around spool 40, is wrapped the exciting winding EW. Stator S, by employing the illustrated structure, has outwardly facing spaced pole surfaces 20', 22' which are in generally the same cylindrical shape and form the outermost fixed portion of the stator.

Rotor R rotates on axis x about the cylindrical pole surfaces 20', 22' of stator S. This rotor is mounted on shaft 50, the displaced angle of which is to be sensed by the resolver. A cup-shaped member 60 is fixedly secured onto shaft 50 by an appropriate means, illustrated as set screw 62. Cup-shaped member 60 includes an inwardly extending cylindrical sleeve 64 having an internal shoulder 66 adjacent inwardly facing cylindrical surface 68. As shaft 50 rotates about central axis x, cup-shaped member 60 rotates about the same axis so that surface 68 rotates in a concentric fashion about the cylindrical surface defined by pole surfaces 20', 22'. To create the rotating flux controlling the transformer action between exciter winding EW and sensed windings SW, the invention employs a flux concentrating ring 70 formed from soft iron laminations and including an outer cylindrical surface 72 matching and affixed to inwardly facing cylindrical surface 68 of cup-shaped member 60. Flux concentrating ring 70 includes an inner cylindrical surface 74 which is concentric to axis x and, thus, concentric surfaces 20', 22'. Flux concentrating ring 70 is skewed in an axial direction a distance a', as shown in FIG. 3. This distance is coordinated with spacing a and the width b of surfaces 20, 22 so that as rotor R is rotated about axis x, the flux path created by high permeability ring 70 is directed from one portion of one pole piece 20 or 22 to the diametrically opposite portion of the other pole piece 20 or 22. As ring 70 rotates, the flux field continues to rotate from one position of one pole piece to a diametrically opposite position of the other pole piece. This rotating flux field causes alternation of the flux in various areas of the stator to effect the magnetic coupling between the flux caused by the current flow through the exciter winding and the induced voltage in the sensed windings. In this manner, resolver R operates in accordance with the technique utilized in Luneau U.S. Pat. No. 4,659,953. The width of surface 74 is generally larger than width b of pole surfaces 20, 22; however, the width of surface 74 can be varied.

In the illustrated embodiment of the invention, a high permeability fixed flux shield 80 surrounds sleeve 64 of member 60, which member is formed from a low permeability material. Shield 80 prevents stray fields from affecting the operation of resolver A; however, it is optional. Referring now to FIG. 3, a modification of the present invention is illustrated wherein cylindrical sleeve 80' forms a shield against stray flux. This shield is mounted directly onto the low permeability sleeve portion of member 60 and is not preferred. FIG. 4 illustrates a still further modification of the invention wherein the cup-shaped member 60 is formed as a plastic member 60' instead of a stainless steel member as illustrated in FIG. 2.

A primary aspect of the invention is making stator S the inner member of the resolver A, while still retaining the tremendous advantage of the prior two spaced pole reluctance varying resolver concept. By this novel structure, the sensed windings SW can be wound onto the stator by a standard bobbin winding machines. In this fashion, there is a substantial reduction in the labor costs and a reduction in the time necessary for assembling the sensing or output windings of the resolver. More consistent results are obtainable by using a winding technique having less human content. In addition, a variety of winding techniques and error correcting procedures can be employed at relatively low cost to produce a high quality, reliable resolver having the advantages defined in the introductory portion of this disclosure.

Figure 5:
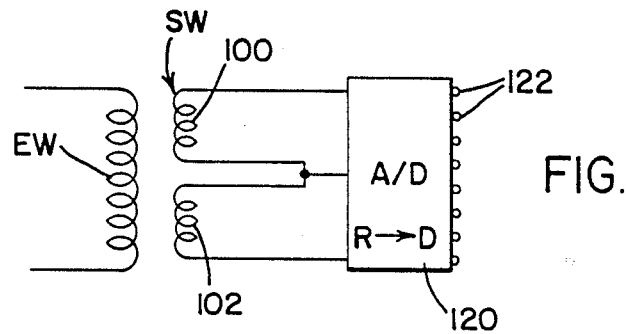
FIG. 5 is a wiring diagram illustrating a system for use of a resolver constructed in accordance with the present invention with an integrated chip analog to digital converter.
Figure 6:
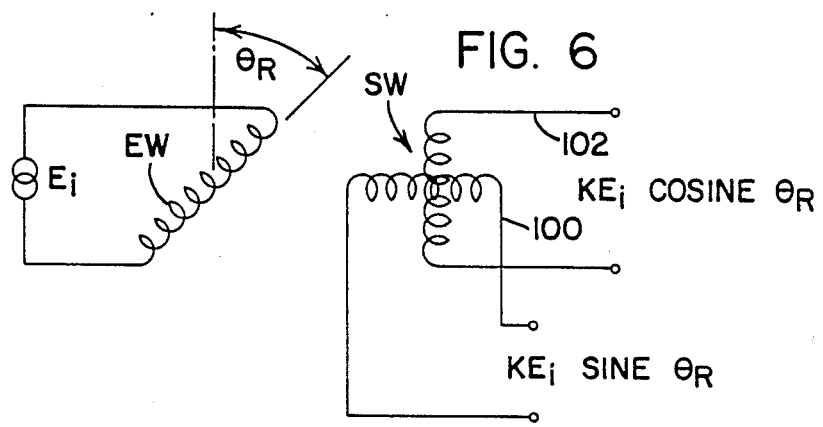
FIG. 6 is a schematic wiring diagram of a standard resolver together with sufficient labels to explain the operating characteristics of a resolver.
Figure 7:
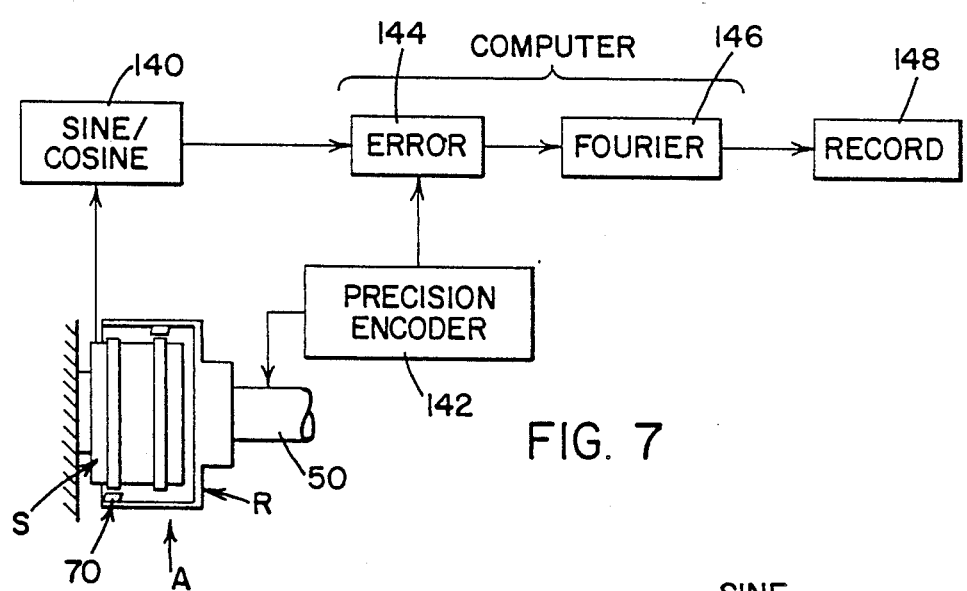
FIG. 7 is a schematic block diagram showing the system for creating an error curve as illustrated in FIG. 15.
Figure 15:
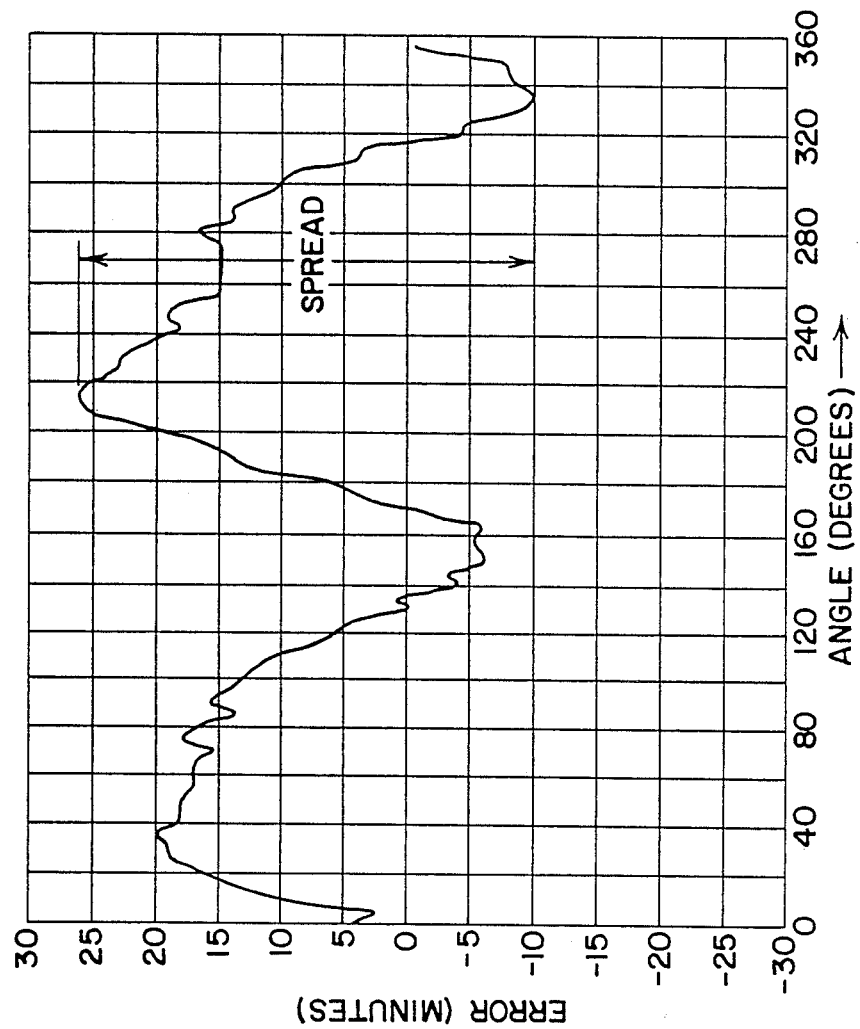
FIG. 15 is an "error curve" of the second harmonic obtained in testing a resolver constructed in accordance with the embodiment of the present invention where the windings are formed as shown in FIG. 8.
Figure 16:
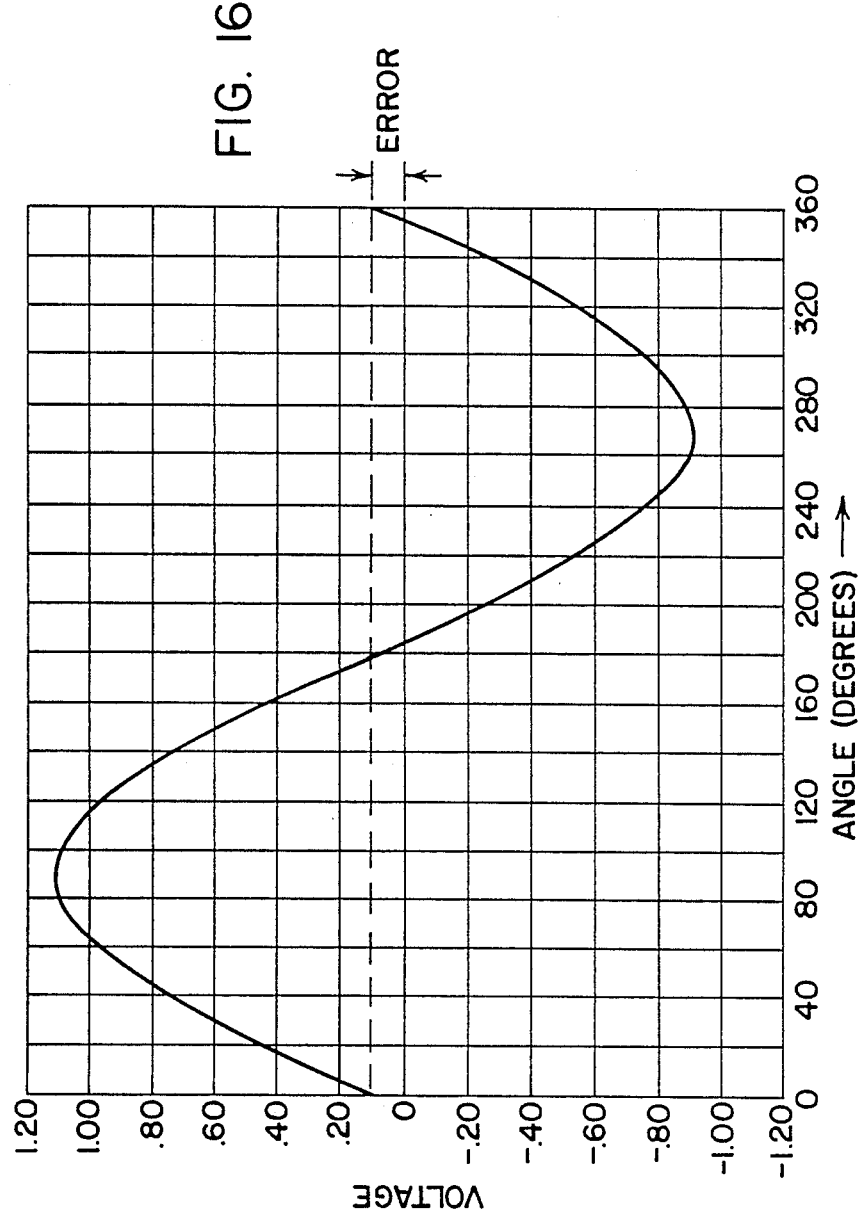
FIG. 16 is a curve showing the voltage induced into the sine winding of FIG. 8 illustrated for the purpose of explaining graphically an error correction procedure performed in accordance with one aspect of the present invention.

Referring now to FIGS. 5–7, FIG. 5 shows a use of the present invention. Exciter winding EW mounted on spool 40 is supplied with an ac voltage of a fixed frequency, such as 5,000 Hertz. Transformer action between that voltage, as an input, and the two orthogonally positioned windings 100, 102 forming sensed windings SW creates a sine wave in winding 100 and a cosine wave in winding 102. The rotary field created by rotation of flux concentrating ring 70 around pole pieces 20, 22 controls voltage levels of the wave forms in windings 100, 102 at any given position of the rotor with respect to the stator. Windings 100, 102 have input leads connected to the standard integrated chip 120 of the type designed especially for converting the sine and cosine waves from a resolver into a series of logic states on a plurality of output terminals 122. The particular logic on these terminals produces the digital number indicative of the angle of shaft 50. The electrical characteristics of a standard resolver concept are illustrated in FIG. 6 wherein the angle R represents the angle of the shaft 50. FIG. 7 represents a schematic layout of the manner by which an "error curve" can be created for each harmonic of a resolver manufactured in accordance with the present invention. Resolver A includes rotor R having inwardly facing, skewed flux concentrating ring 70. As shaft 50 rotates, the constructed sine cosine angle is created by a standard processing circuit 140 which can be the chip 120, shown in FIG. 5. The constructed angle for either the sine or cosine is compared with the actual angle from a precision encoder 142. The comparison is performed by a software program represented as box 144. This error signal for the sine or for the cosine is processed by a Fourier processor 146, also by software, to produce a fluctuating error signal for the sine voltage or for the cosine voltage for a preselected harmonic. In practice, voltage as shown in FIG. 16 produced a fundamental, i.e. first harmonic, in the error curve. The error curve is normally digital; however, it can be constructed or displayed as an analog curve as shown in FIG. 15. The analog version of the error curve is merely a plot of the digital information from the output of circuit 140. From the error curves, a set of which is generated for each resolver A manufactured, corrective measures as explained later can be taken to reduce the amount of error, even though in practice the use of the present invention, especially the preferred embodiment shown in FIGS. 9 and 10, has resulted in a vast majority of the resolvers being within acceptable tolerances with respect to the error curves for the second harmonic error.

WINDING OF THE STATOR

Figure 12:
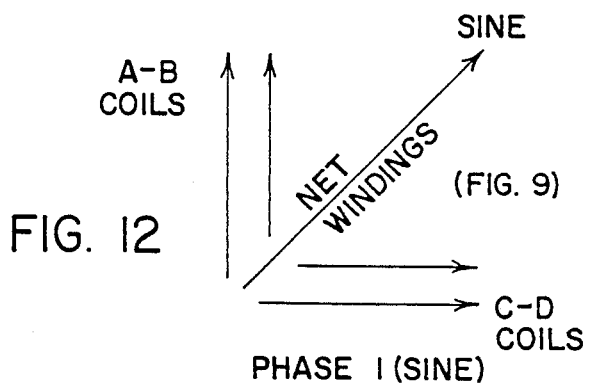
FIG. 12 is a vector diagram of the voltage vectors for the various coil groups in FIG. 9.
Figure 14:
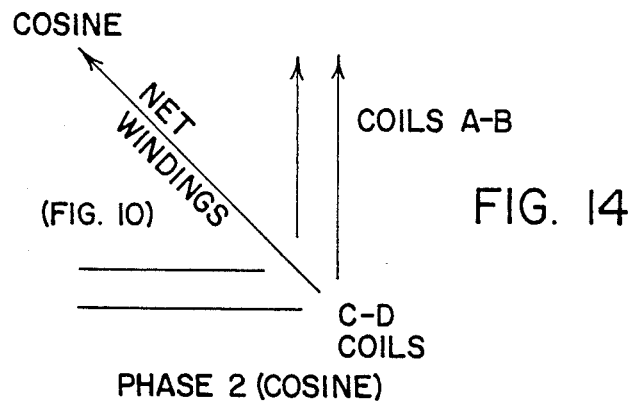
FIG. 14 is a vector graph of the voltage vectors for the various coil groups in FIG. 10.
Figure 13:
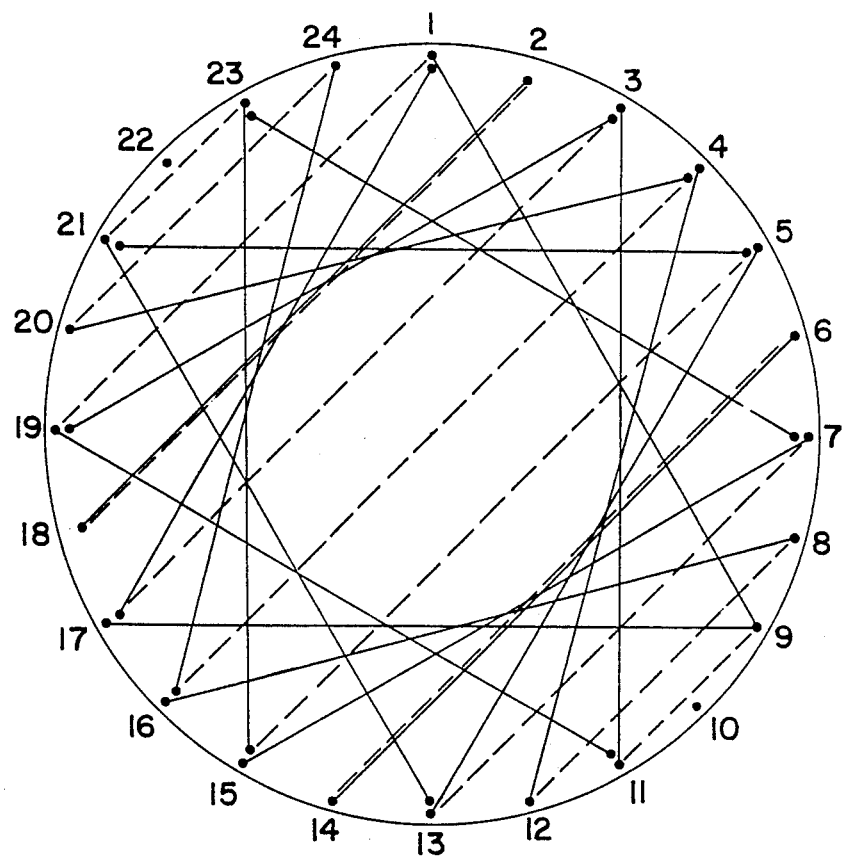
FIG. 13 is a geometric slot graph illustrating the winding concept shown in FIGS. 9 and 10.

In accordance with the present invention, a unique arrangement has been devised for assembling the two sensing windings SW onto stator S between spaced sets 30, 32 of coil receiving slots on pole pieces 20, 22. Two implementations of this aspect of the invention are illustrated in FIGS. 8–10. The first approach is shown in FIG. 8 where sine winding 100 includes two diametrically spaced groups A, B of individual coils 200. Each of these coils has a fixed pitch and the number of turns in each coil 200 is such that a sinusoidal voltage is created across the output leads of winding 100 as resolver A operates. In a like manner, cosine sensing winding 102 is divided into two diametrically opposed groups C, D of coils 220. The vector representation of the induced voltage in winding 100 is the solid arrow shown in FIG. 8. The dashed arrow is the vector representation of the cosine voltage in winding 102. The winding system illustrated in FIG. 8 differs from the standard resolver winding system in that it employs a constant pitch with a variable number of turns in each coil 200, 220. This is the broad aspect of the winding concept; however, it has been found that more uniformity can be created by employing a more specific use of this aspect, as illustrated in FIGS. 9 and 10. In FIG. 9, the sine sensing winding 100 is illustrated as being formed into four series connected groups A, B, C, D of individual coils 200. These coil groups are located on the pole pieces of stator S at 90° positions. In this manner, the vector of the sine created by the four separate groups of coils is the solid line arrow in FIG. 9 and set forth vectorally in FIG. 12. The dashed line arrow in FIG. 9 represents the effective cosine voltage created in output sense winding 102 as illustrated in FIG. 10 and set forth vectorally in FIG. 13. This cosine winding is also divided into four separate and distinct groups A, B, C and D of coils. The sine winding 100 and the cosine winding are located in an orthogonal relationship. By winding the stator in accordance with the technique set forth in FIGS. 9 and 10, most second harmonic errors are removed and a relatively uniform wave shape with low output errors is obtained. In the past, the higher harmonics were diminished by providing different numbers of turns in the various coils for each phase. This is continued in the present invention. In addition, it has been known to adjust the number of turns in each of the individual coils of the groups to create a sinusoidal wave shape. The advantage of the present invention as set forth in FIG. 8 generally and more specifically in FIGS. 9 and 10, is that errors are self cancelling to provide more symmetrical outputs. The various mechanical and electrical variations are cancelled by this type of winding scheme wherein each sensing winding 100, 102 is divided into four separate, series connected groups of coils 200, 220, respectively. These windings are in orthogonal positions at 90° offset around the pole pieces 20, 22. By the relatively large slot spacing and a constant pitch for the various coils 200 220, leakage is also reduced.

WINDING ARCHITECTURE

Figure 11:
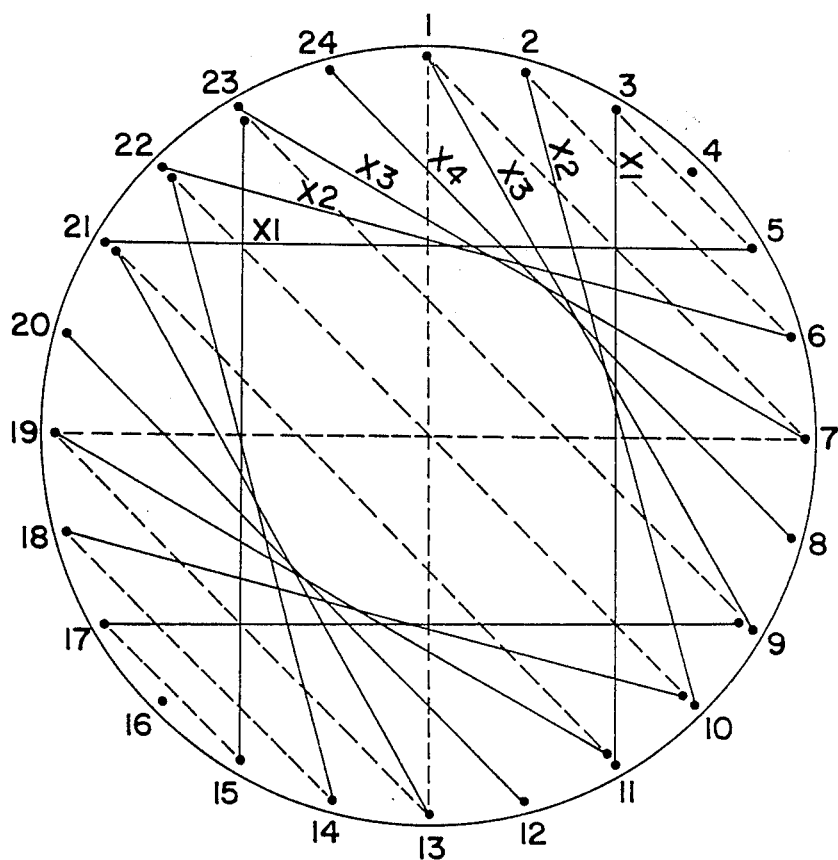
FIG. 11 is a geometric slot graph showing the winding concept illustrated in FIG. 8.

As previously described, when using the winding technique set forth in FIGS. 8–10, the individual coils 200, 220 have the same pitch, but have different numbers of turns to obtain sinusoidal output waves. The use of this concept in the preferred embodiment is schematically illustrated in the geometric slot graphs shown in FIGS. 11 and 13 together with the winding information set forth on these graphs. Referring first to FIG. 11, using standard practice for winding resolvers, a twenty-four slot pole piece would be wound with two diametrically spaced sets of coils, each containing six coils having gradually increasing pitch and a different number of turns. This is set forth at the right of FIG. 11 wherein the first coil X1 would extend between slots No. 3 and No. 5 and contain a first number of turns given as X1. This same coil (X1) would extend between slots 15 and 17. As can be seen, slot No. 4 and No. 16 would not be occupied by a coil. The second coil X2 would extend between slots No. 2 and No. 6. This would correspond in size and number of turns (i.e. X2) to the coils in the slots No. 14 and No. 17. The coils used in the prior art concept are set forth in the table The sixth coil is two times coil X2 and, below.

| PRIOR ART (CANCEL 3f–21f) SLOTS | |
|---|---|
| X1 = | 3 to 5 |
|  | 15 to 17 |
| X2 = | 2 to 6 |
|  | 14 to 18 |
| X3 = | 1 to 7 |
|  | 13 to 19 |
| X4 = | 8 to 24 |
|  | 12 to 20 |
| X1 + X3 = | 9 to 23 |
|  | 11 to 21 |
| 2 · X2 = | 10 to 22; |

The sixth coil is two times coil X2 and is contained between slots No. 10 and No. 22. It has been found that these two groups (A, B) of six coils ametrically opposed to each other would produce a sinusoidal sine or cosine voltage output for the preferred embodiment of the present invention, as shown in FIGS. 1 and 2. This uses standard winding practice for resolvers A. In this manner, the third through twenty-first harmonics are essentially cancelled. The two groups of coils are connected in series as shown in FIG. 8. The difference between the prior art and the present invention, in the area of the windings scheme, is shown in FIG. 8. The inventive concept of employing constant pitch coils and winding them on the outside of the stator is illustrated. The prior art scheme shown in the table above involves variable pitch coils as well as coils with different turns X1-X4 or combinations thereof. This table relates to only one of the output windings. In the prior art, a second group of coils having the same number of turns (X1, X2, X3, X4 or combinations thereof) is positioned orthogonally on the stator. This prior concept was used for internal winding and produces sine and cosine output windings. Using this prior practice, the numbers (X1, X2, X3 and X4) used in forming each output winding was proportioned to produce the desired output. In doing that, it was found that a percentage of total turns in each of the coils is as follows:

X1=6.815%

X2=13.165%

X3=18.618%

X4=22.803%

Using these values and the prior art table above, the percentage indicates the percentage of number of turns in the individual slots. These percentages total 100%. The coupling factor for this winding is 78.99% effective. This same relationship existed for both sine and cosine output winding.

This prior variable pitch winding concept does not facilitate low cost production. It can not be accomplished by a standard winding machine. Further, the stator was the external member; therefore, the windings had to be formed and pushed in place. By employing the present invention of a central stator and the winding concept schematically illustrated in FIG. 8, each of the coils on the stator has a constant pitch of eight slots or a ⅔ pole pitch. This concept of FIG. 8 is schematically illustrated in FIG. 11. As can be seen, when using the prior art concept of a variable pitch arrangement, eleven coils are employed, with two coils between slots 10 and 22. In the prior art arrangement, the number of turns in each slot is listed as follows:

| SLOT NOS. 1-24 | NO. OF TURNS |
|---|---|
| 1 | X3 |
| 2 | X2 |
| 3 | X1 |
| 4 | 0 |
| 5 | −X1 |
| 6 | −X2 |
| 7 | −X3 |
| 8 | −X4 |
| 9 | −(X1 + X3) |
| 10 | −(2 · X2) |
| 11 | −(X1 + X3) |
| 12 | −X4 |
| 13 | −X3 |
| 14 | −X2 |
| 15 | −X1 |
| 16 | 0 |
| 17 | −X1 |
| 18 | −X2 |
| 19 | +X3 |
| 20 | +X4 |
| 21 | X1 + X3 |
| 22 | 2 · 2X |
| 23 | X1 + X3 |
| 24 | X4 |

As can be seen in FIG. 11, these same numbers of turns are accomplished by constant pitch coils X1-X4 to get the same number of turns in each slot while employing constant pitch for the coils 200, 220. Now fourteen coils are used; however, the number of turns in each slot is still the same as was created in accordance with the prior art winding to accomplish the desired output characteristics. Thus, the concept of FIG. 8 converts a standard winding sequence into a constant pitch winding sequence without changing the basic operating characteristics of the resolver.

Manufacture of a resolver with constant pitch arrangement illustrated schematically in FIG. 11 established that a machine wound constant pitch stator could duplicate the electrical response obtained heretofore by using standard variable pitch coils on the inside of a stator with the coil turn numbers set forth in the prior art table above. This winding concept substantially reduces the cost of the resolver without sacrificing quality. Then the concept was improved as set forth in FIGS. 9 and 10 wherein constant pitch windings were spaced each 90° around stator S of resolver A for both the sine and cosine output windings. This winding architecture is set forth in the slot graph of FIG. 13. windings. This winding architecture is set forth in the slot graph of FIG. 13. The table below indicates the number of turns in each coil of the sine or cosine winding.

| COIL |   |           | COIL |   |            |
|------|---|-----------|------|---|------------|
| 1 — 9 | = | X2       | 13 — 21 | = | —X2     |
| 3 — 11 | = | X4      | 15 — 23 | = | —X4     |
| 4 — 12 | = | X3      | 16 — 24 | = | —X3     |
| 5 — 13 | = | X2      | 17 — 1  | = | —X2     |
| 6 — 14 | = | (2X1 = X3) | 18 — 2 | = | —(2X1 + X3) |
| 7 — 15 | = | X2      | 19 — 3  | = | —X2     |
| 8 — 16 | = | X3      | 20 — 4  | = | —X3     |
| 9 — 17 | = | X4      | 21 — 5  | = | —X4     |
| 11 — 19 | = | X2     | 23 — 7  | = | —X2;    |

The numbers and slot spacings are the same. The sine and cosine windings are offset 90° from each other. In this instance, eighteen coils per phase are in groups A, B, C, D of FIGS. 9 and 10. The turns per slot are somewhat increased over the turns per slot shown in FIG. 11. This is caused by the vector addition of the coils making up the sine and cosine windings. The summation is a square root of 2 greater than one phase shown in FIG. 11. In other words, the number of turns is increased by 1.414. This is clearly illustrated by the table above.

In summary, in accordance with the winding aspect of the invention, the windings have been modified to be constant pitch and wrapped on the outside of the stator. In addition, they have been divided into four groups which are serially connected as shown in FIGS. 9 and 10. Since the voltage is the addition of two vectors 90° apart, this explains the equivalent effective turns as being 1.414 times the turns in a normal sine winding shown in FIG. 8. The sine and cosine windings are still 90° apart. The winding concept illustrated in FIG. 13 produces a smoother low harmonic wave because of the smoothing effect of additional windings that are wound completely around the circumference of the stator.

The sine and cosine sensing windings 100, 102, respectively, are offset from each other by 90°; therefore, they represent quadrature windings. When incorporating four groups as shown in FIGS. 9 and 10, these quadrature windings include four groups of coils connected in series. In this manner, twenty-two separate coils are obtained when a twenty-four slot stator is employed. Of course, this same concept could be employed for various numbers of stator slots. This latter configuration shown in FIG. 13 produces even a more sinusoidal wave shape and lower harmonic distortion.

ERROR CORRECTION

As is explained in connection with FIG. 7, a digital error curve for the fundamental and each harmonic can be determined for resolver A by employing a relatively low power computer that records the instantaneous error in angle and processes it by a Fourier program. This program creates a digital or analog plot of the error for each revolution of the resolver. FIG. 15 is an analog display of a representative error curve. This curve was created with the resolver having the winding characteristics explained in connection with FIG. 8. In FIG. 15, the spread of error is about 35 minutes with the largest error being approximately 25 minutes in the positive direction at approximately 220°. This error curve is basically second harmonic, since the error curve for the fundamental (first) harmonic was less than 5 minutes. It has been found that this second error harmonic can be corrected by using the lead of one of the sensing coils 110, 112. The lead is wrapped as an auxiliary winding between spaced slots to counteract an error. Such lead is schematically illustrated as lead 100a in FIG. 8. It has been found that when employing the winding concept illustrated in FIGS. 9 and 10 such correction is generally not required even though it is applicable to this particular winding architecture.

FIG. 15 illustrates an error curve with a large second harmonic error. To correct the voltage offset in FIG. 16, which produces fundamental error, lead 100b is wrapped orthogonally around the coils of windings 100, 102 in concentric fashion with respect to the exciting winding EW, as shown in FIG. 17 and schematically represented in the electrical diagram of FIG. 18. By the proper winding direction and the proper number of turns, the voltage curve of FIG. 16 can be shifted with respect to the zero axis. The correcting procedures for the errors shown by the error curves of the resolver were employed for a resolver with the winding shown in FIG. 8. By using the winding illustrated in FIGS. 9 and 10 the errors are not beyond the acceptable limits imposed by industry. There is generally no need for correction. To produce still a higher precision resolver, these error techniques can be employed when using even the second embodiment of the winding aspect of the present invention.

An increased insulation 250 shown in FIG. 17 also reduces the mutual capacitance between coils 200, 220 while further reducing error in the resolver. In accordance with the winding technique now employed, approximately 50% of one of the sensed windings is applied to the stator, and then the entire other winding is applied to the stator. This procedure is followed by applying the remaining 50% of the first output winding. This produces an overlap concept which further adds to the symmetrical nature of the output wave form and assists in reducing inconsistencies in the resolver.

In a size 15 resolver the present invention produces error curves having a spread of less than 20 minutes. An error of 25 minutes of fundamental error requires one turn of lead 100b concentric with the exciting winding EW. If the error is less than 30 minutes of offset, a partial turn is placed around the exciter winding. With respect to the correction of second harmonic errors, by use of lead 100a, each turn cancels approximately four minutes. Thus, if there is an error, the sine curve lead 100a of the sine winding is wrapped around the stator with the number of turns which will offset the error. This auxiliary coil is placed in appropriate slots for cancelling the error. For instance if the sine error is approximately six minutes, a one turn auxiliary winding is sufficient if it is laid in the proper slots for cancelling the error. The cosine curve which is similar to the sine curve shown in FIG. 15 is subjected to the same compensation or correction technique. If an error, for example a 11 minute error, is found in the cosine at a certain angle, a three turns auxiliary coil formed by an input lead of the cosine output winding would be laid in the appropriate slots. Thus, in each resolver, two separate auxiliary coils may be employed for the purposes of correcting both the sine and cosine errors as determined by the error curve generated in the technique explained in connection with FIG. 7.

EXAMPLE

The resolver which formed the basis of the illustrated preferred embodiment was a size 15 resolver with a mounted spread accuracy of 40 minutes. The exciting frequency was 5000 Hz with an input voltage of 4.0 volts and an input current of 54 mA. The input D.C. resistance was 10 Ohms and the output dc resistance for each winding was 82 Ohms. The rotor moment of inertia was 56 gm-cm$^2$. The length of the resolver was 1.41 inches and the shaft length required for mounting was 1.41 inches. The shaft diameter was 0.25 inches. Shafts up to about 0.5 inches can be accommodated by this design concept.

Having thus defined the invention, the following is claimed:

1. A rotary control signal generating device comprising: an internal stator including first and second ring-shaped pole pieces having generally cylindrical, outwardly facing first and second pole surfaces axially spaced from each other a given distance, said pole surfaces being generally concentric with a given axis and having the same outermost diameter, said pole pieces including a given number of coil receiving slots equally spaced circumferentially around said pole pieces and with the slots on said first pole piece being axially aligned with corresponding slots on said second pole piece to form sets of slots, said stator having a multiturn, ac primary exciter winding between said pole pieces and wound concentric with said given axis, whereby a ac voltage of known frequency magnetizes said pole pieces, and said stator having first and second positionally offset sensing windings wound on said pole pieces and in said aligned sets of slots as groups of individual coils; and, an external rotor rotatable about said given axis, said rotor including a high permeability flux concentrating ring with an inwardly facing, generally cylindrical surface concentric with said given axis and spaced sightly outwardly in a radial direction from the cylindrical surface defined by said first and second pole surfaces, said inwardly facing surface of said ring being axially skewed a distance correlated to said given distance whereby as a first portion of said ring is across from said first pole surface a circumferentially spaced second portion of said ring is across from said second pole surface.

2. A rotary control signal generating device as defined in claim 1 wherein said first and second portions of said skewed ring are diametrically spaced from each other.

3. A rotary control signal generating device as defined in claim 2 wherein said rotor is a cup shaped member with means for connecting said member to a rotatable shaft, the angle of which is monitored by the voltages on said sensing windings.

4. A rotary control signal generating device as defined in claim 3 wherein said stator includes a central rotatable shaft accommodating opening.

5. A rotary control signal generating device as defined in claim 4 wherein said cup shaped member includes an outer layer of high permeability material.

6. A rotary control signal generating device as defined in claim 5 wherein said cup shaped member is formed from plastic.

7. A rotary control signal generating device as defined in claim 6 wherein said flux concentrating ring is formed from laminations of high permeability sheet metal.

8. A rotary control signal generating device as defined in claim 1 wherein said flux concentrating ring is formed from laminations of high permeability sheet metal.

9. A rotary control signal generating device as defined in claim 2 wherein said flux concentrating ring is formed from laminations of high permeability sheet metal.

10. A rotary control signal generating device as defined in claim 3 wherein said flux concentrating ring is formed from laminations of high permeability sheet metal.

11. A rotary control signal generating device as defined in claim 1 wherein said rotor is a cup shaped member with means for connecting said member to a rotatable shaft, the angle of which is monitored by the voltages on said sensing windings.

12. A rotary control signal generating device as defined in claim 11 wherein said stator includes a central rotatable shaft accommodating opening.

13. A rotary control signal generating device as defined in claim 11 wherein said cup shaped member includes an outer layer of high permeability material.

14. A rotary control signal generating device as defined in claim 11 wherein said cup shaped member is formed from plastic.

15. A rotary control signal generating device as defined in claim 1 wherein said stator includes a central rotatable shaft accommodating opening.

16. A rotary control signal generating device as defined in claim 1 wherein each of said first and second sensing windings are formed from a number of coils wound between two equally spaced sets of slots in said pole pieces, with said coils having equal slot pitch and a variable number of turns selected to produce a generally sinusoidal output wave form for said sensing windings.

17. A rotary control signal generating device as defined in claim 16 wherein said number of coils is divided into a first group and a second group connected in series and spaced diametrically on said pole pieces to produce a single phase sinusoidal wave form.

18. A rotary control signal generating device as defined in claim 17 wherein said number of coils is divided into four groups connected in series and spaced in four equally spaced sectors of said pole pieces to produce a two phase sinusoidal wave form.

19. A rotary control signal generating device as defined in claim 2 wherein each of said first and second sensing windings are formed from a number of coils wound between two equally spaced sets of slots in said pole pieces, with said coils having equal slot pitch and a variable number of turns selected to produce a generally sinusoidal output wave form, for said sensing winding.

20. A rotary control signal generating device as defined in claim 19 wherein said number of coils is divided into a first group and a second group connected in series and spaced diametrically on said pole pieces to produce a single phase sinusoidal wave form.

21. A rotary control signal generating device as defined in claim 20 wherein said number of coils is divided into four groups connected in series and spaced in four equally spaced sectors of said pole pieces to produce a two phase sinusoidal wave form.

22. A rotary control signal generating device as defined in claim 8 wherein each of said first and second sensing windings are formed from a number of coils wound between two equally spaced sets of slots in said pole pieces, with said coils having equal slot pitch and a variable number of turns selected to produce a generally sinusoidal output wave form, for said sensing winding.

23. A rotary control signal generating device as defined in claim 22 wherein said number of coils is divided into a first group and a second group connected in series and spaced diametrically on said pole pieces to produce a single phase sinusoidal wave form.

24. A rotary control signal generating device as defined in claim 23 wherein said number of coils is divided into four groups connected in series and spaced in four equally spaced sectors of said pole pieces to produce a two phase sinusoidal wave form.

25. A rotary control signal generating device as defined in claim 11 wherein each of said first and second sensing windings are formed from a number of coils wound between two equally spaced sets of slots in said pole pieces, with said coils having equal slot pitch and a variable number of turns selected to produce a generally sinusoidal output wave form, for said sensing winding.

26. A rotary control signal generating device as defined in claim 25 wherein said number of coils is divided into a first group and a second group connected in series and spaced diametrically on said pole pieces to produce a single phase sinusoidal wave form.

27. A rotary control signal generating device as defined in claim 26 wherein said number of coils is divided into four groups connected in series and spaced in four equally spaced sectors of said pole pieces to produce a two phase sinusoidal wave form.

28. A rotary control signal generating device as defined in claim 1 wherein said sensing winding includes a pair of leads and including conductor means for offsetting the error curve of said signal generating device, said conductor means including a portion of one of said leads wound concentric with said exciter winding.

29. A rotary control signal generating device as defined in claim 8 wherein said one of said sensing windings includes a pair of leads and, means for cancelling a selected portion of the error curve of said signal generating device, said cancelling means includes a portion of one of said leads wound between two spaced pairs of slots.

30. A rotary control signal generating device as defined in claim 16 wherein said sensing winding includes a pair of leads wherein and a portion of one of said leads is wound concentric with said exciter winding to offset the error curve of said signal generating device.

31. A rotary control signal generating device as defined in claim 30 wherein the length of said portion is selected to offset the first harmonic error curve.

32. A rotary control signal generating device as defined in claim 19 wherein said sensing winding includes a pair of leads and wherein a portion of one of said leads is wound concentric with said exciter winding to offset the error curve of said signal generating device.

33. A rotary control signal generating device as defined in claim 32 wherein the length of said portion is selected to offset the first harmonic error curve.

34. A rotary control signal generating device as defined in claim 8 wherein said sensing winding includes a pair of leads and wherein a portion of one of said leads is wound concentric with said exciter winding to offset the error curve of said signal generating device.

35. A rotary control signal generating device as defined in claim 11 wherein said one of said sensing windings includes a pair of leads and, means for cancelling a selected portion of the error curve of said signal generating device, said cancelling means includes a portion of one of said leads wound between two spaced pairs of slots.

36. A rotary control signal generating device as defined in claim 11 wherein said sensing winding includes a pair of leads and including conductor means for offsetting the error curve of said signal generating device, said conductor means including a portion of one of said leads wound concentric with said exciter winding.

37. A rotary control signal generating device as defined in claim 1 wherein said one of said sensing windings includes a pair of leads and, means for cancelling a selected portion of the error curve of said signal generating device, said cancelling means includes a portion of one of said leads wound between two spaced pairs of slots.

38. A rotary control signal generating device as defined in claim 16 wherein said one of said sensing windings includes a pair of leads and, means for cancelling a selected portion of the error curve of said signal generating device, said cancelling means includes a portion of one of said leads wound between two spaced pairs of slots.

39. A rotary control signal generating device as defined in claim 19 wherein said one of said sensing windings includes a pair of leads and, means for cancelling a selected portion of the error curve of said signal generating device, said cancelling means includes a portion of one of said leads wound between two spaced pairs of slots.

40. In a resolver including a stator with a pole piece adapted to receive an exciter winding and two positionally offset sensing windings each formed as a number of series connected individual coils wound between circumferential slots on said pole piece and a high permeability flux directing rotor rotated with respect to said stator to rotate the flux field as the exciting winding induces voltages into said two sensing windings, the improvement comprising: means for offsetting the error curve of said signal generating device, said offsetting means includes a pair of leads and with a portion of one of said leads being wound concentric with said exciter winding.

41. In a resolver including a stator with a pole piece adapted to receive an exciter winding and two positionally offset sensing windings each formed as a number of series connected individual coils wound between circumferential slots on said pole piece and a high permeability flux directing rotor rotated with respect to said stator to rotate the flux field as the exciting winding induced voltage into said two sensing windings, the improvement comprising: means for cancelling a selected portion of the error curve of said signal generating curve, said cancelling means including a pair of leads with a portion of one of said leads being wound between two spaced pairs of slots.

42. In a resolver of the type having a stator including means forming two axially spaced, concentric pole surfaces with a number of circumferentially spaced pairs of axially spaced coil receiving slots, one slot of each pair being in one of said pole surfaces, a multiturn ac primary exciter winding between and wound concentric with said pole pieces and first and second positionally offset sensing windings mounted on said pole pieces as a number of individual series connected coils wound between spaced pairs of said aligned pairs of slots; and, said resolver having a rotor with a flux concentrator ring formed with axially offset portions, whereby rotation of said ring with respect to said pole pieces alternates the flux field between said spaced pole pieces, the improvement comprising: each of said first and second sensing windings are formed from a number of individual coils wound between two sets of slots in said pole pieces, with said individual coils each having equal slot pitch and a variable number of turns selected to produce a generally sinusoidal output wave form for said sensing winding.

43. The improvement defined in claim 42 wherein said number of coils is divided into a first group and a second group connected in series and spaced diametrically on said pole pieces to produce a single phase sinusoidal wave form.

44. The improvement as defined in claim 43 wherein said number of coils is divided into four groups connected in series and spaced in four equally spaced sectors of said pole pieces to produce a two phase sinusoidal wave form.

45. In a resolver including a stator with a pole piece adapted to receive an exciter winding and two positionally offset sensing windings each formed as a number of series connected individual coils wound between circumferential slots on said pole piece and a high permeability flux directing rotor rotated with respect to said stator to rotate the flux field as the exciting winding induces voltages into said two sensing windings, the improvement comprising: each of said first and second sensing windings being formed from a number of coils wound between two equally spaced slots in said pole pieces, with said coils having equal slot pitch and a variable number of turns selected to produce a generally sinusoidal output wave form for said sensing winding.

46. The improvement as defined in claim 45 wherein said number of coils is divided into a first group and a second group connected in series and spaced diametrically on said pole pieces to produce a single phase sinusoidal wave form.

47. The improvement as defined in claim 46 wherein said number of coils is divided into four groups connected in series and spaced in four equally spaced sectors of said pole pieces to produce a two phase sinusoidal wave form.

48. The improvement as defined in claim 47 wherein said sensing winding includes a pair of leads and wherein a portion of one of said leads is wound concentric with said exciter winding to offset the error curve of said signal generating device.

49. The improvement as defined in claim 48 wherein the length of said portion is selected to offset the first harmonic error curve.

50. The improvement as defined in claim 45 wherein said sensing winding includes a pair of leads and wherein a portion of one of said leads is wound concentric with said exciter winding to offset the error curve of said signal generating device.

51. The improvement as defined in claim 50 wherein the length of said portion is selected to offset the first harmonic error curve.

52. The improvement as defined in claim 45 wherein said one of said sensing windings includes a pair of leads and wherein a portion of one of said leads is wound between two spaced pairs of slots to cancel a selected portion of the error curve of said signal generating device.

53. The improvement as defined in claim 52 wherein the number of turns and location of said lead portion is selected to compensate for deviation in the second harmonic error curve of said one sensing winding.

* * * * *